United States Patent
Wang et al.

(10) Patent No.: US 10,139,668 B2
(45) Date of Patent: Nov. 27, 2018

(54) CURVED SURFACE ADS DISPLAY PANEL AND MANUFACTURING METHOD THEREOF

(71) Applicant: BOE TECHNOLOGY GROUP CO., LTD., Beijing (CN)

(72) Inventors: Xinxing Wang, Beijing (CN); Jikai Yao, Beijing (CN); Jaegeon You, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 15/862,739

(22) Filed: Jan. 5, 2018

(65) Prior Publication Data

US 2018/0299611 A1   Oct. 18, 2018

(30) Foreign Application Priority Data

Apr. 13, 2017   (CN) .......................... 2017 1 0240860

(51) Int. Cl.
| | |
|---|---|
| *G02F 1/1339* | (2006.01) |
| *G02F 1/1335* | (2006.01) |
| *F21V 8/00* | (2006.01) |
| *G02F 1/13363* | (2006.01) |
| *G02F 1/1337* | (2006.01) |
| *C03C 4/00* | (2006.01) |

(52) U.S. Cl.
CPC ....... *G02F 1/133524* (2013.01); *G02B 6/004* (2013.01); *G02B 6/0015* (2013.01); *G02B 6/0065* (2013.01); *G02F 1/1337* (2013.01); *G02F 1/13363* (2013.01); *G02F 1/133528* (2013.01); *C03C 4/0092* (2013.01); *G02F 2201/50* (2013.01); *G02F 2202/28* (2013.01); *G02F 2413/08* (2013.01)

(58) Field of Classification Search
CPC ............ G02F 1/133524; G02F 1/1337; G02F 1/13363; G02F 1/133528; G02F 2413/08; G02F 2202/28; G02F 2201/50; G02B 6/004; G02B 6/0015; G02B 6/0065; C03C 4/0092

See application file for complete search history.

(56) References Cited

U.S. PATENT DOCUMENTS

| | | | | |
|---|---|---|---|---|
| 7,209,212 | B2* | 4/2007 | Chuang | G02F 1/1326 349/196 |
| 2014/0092356 | A1* | 4/2014 | Ahn | G02F 1/1339 349/153 |
| 2015/0253468 | A1* | 9/2015 | Zuo | G02F 1/133528 349/96 |
| 2015/0323832 | A1* | 11/2015 | Guo | G02F 1/133514 349/61 |

* cited by examiner

*Primary Examiner* — Tracie Y Green
(74) *Attorney, Agent, or Firm* — Calfee, Halter & Griswold LLP

(57) ABSTRACT

A curved surface ADS display panel and a manufacturing method thereof are disclosed. The curved surface ADS display panel includes a first substrate; a second substrate facing the first substrate, wherein the second substrate has a first surface far away from the first substrate; a liquid crystal layer sandwiched between the first substrate and the second substrate; and a glass light guide plate completely adhered on the first surface of the second substrate. Also, the glass light guide plate has a thickness of D1, and the first substrate, the liquid crystal layer, and the second substrate have a total thickness of D2, wherein $|D1-3 D2|/D1 \leq 30\%$.

14 Claims, 6 Drawing Sheets

(a)

(b)

(a)

(b)

CURVED SURFACE ADS DISPLAY PANEL AND MANUFACTURING METHOD THEREOF

CROSS REFERENCE TO RELATED APPLICATIONS

This application claims priority to the Chinese patent application No. 201710240860.6 filed on Apr. 13, 2017, the entirety of which is incorporated herein by reference.

TECHNICAL FIELD

The present disclosure relates to the technical field of display panels, specifically, to a curved surface ADS display panel and a manufacturing method thereof.

BACKGROUND

A typical curved surface ADS (Advanced Super Dimension Switch) display panel consists of a first substrate, a liquid crystal layer, a second substrate and a light guide plate arranged in sequence. Generally, the light guide plate is made of Polymethyl methacrylate (PMMA). As an example, the first substrate can be a color film substrate, and the second substrate can be an array substrate, wherein the light guide plate is provided with a prismatic lens and a diffuser. Conventionally, the second substrate and the light guide plate are adhered together by a double-sided adhesive or the like. In addition, it should be easily understood by those skilled in the art that the liquid crystal layer can also bond the first substrate and the second substrate together. Thus, as far as the effect of the stress on shapes of the first substrate and the second substrate is concerned, the first substrate and the second substrate can be considered as a whole. Likewise, since the light guide plate is provided with the prismatic lens and the diffuser, the double-sided adhesive only bond the second substrate and edges of the light guide plate together. Thus, as far as the effect of the stress on shapes of the first substrate, the second substrate and the light guide plate is concerned, the light guide plate and the first substrate or the second substrate cannot be considered as a whole. That is to say, in a conventional curved surface ADS display panel, only the first substrate and the second substrate can be considered as a whole for analyzing the stress state. In this case, the first substrate and the second substrate generally have a comparable thickness.

SUMMARY

According to an embodiment of the present disclosure, a curved surface ADS display panel is provided. The curved surface ADS display panel comprises: a first substrate, a second substrate facing the first substrate, and a liquid crystal layer sandwiched between the first substrate and the second substrate. The second substrate has a first surface far away from the first substrate, and the curved surface ADS display panel further comprises a glass light guide plate completely adhered on the first surface of the second substrate. In addition, in the curved surface ADS display panel, the glass light guide plate has a thickness of D1, and the first substrate, the liquid crystal layer, and the second substrate have a total thickness of D2, wherein $|D1-D2|/D1 \leq 30\%$.

In an embodiment of the above curved surface ADS display panel, the glass light guide plate has a thickness of D1, and the first substrate, the liquid crystal layer, and the second substrate have a total thickness of D2, wherein $|D1-D2| \leq 0.3$ mm.

In an embodiment of the above curved surface ADS display panel, the glass light guide plate has a thickness of D1, and the first substrate, the liquid crystal layer, and the second substrate have a total thickness of D2, wherein $D1=D2$.

In an embodiment of the above curved surface ADS display panel, the glass light guide plate is completely adhered on the first surface of the second substrate by an optically clear adhesive (OCA).

In an embodiment of the above curved surface ADS display panel, the OCA, the first substrate, the second substrate and the glass light guide plate all have a proximately (such as, completely) same refractive index.

In an embodiment of the above curved surface ADS display panel, the first substrate has a thickness of 0.1-0.7 mm, and the second substrate has a thickness of 0.1-0.7 mm.

In an embodiment, the curved surface ADS display panel further comprises a print dot layer. Specifically, the glass light guide plate further comprises a second surface facing a first surface, and the print dot layer is disposed on the second surface of the glass light guide plate. The first surface of the glass light guide plate is a surface, which is completely adhered on the first surface of the second substrate, of the glass light guide plate.

According to an embodiment of the present disclosure, a method for manufacturing a curved surface ADS display panel is provided.

Specifically, the method comprises: providing a first substrate and a second substrate facing each other, wherein the second substrate has a first surface far away from the first substrate; filling liquid crystals between the first substrate and the second substrate to form a liquid crystal layer; and adhering a glass light guide plate completely on a first surface of the second substrate. In the above proposed method, the glass light guide plate has a thickness of D1, and the first substrate, the liquid crystal layer, and the second substrate have a total thickness of D2, wherein $|D1-D2|/D1 \leq 30\%$.

In a specific embodiment of the above proposed method, the glass light guide plate has a thickness of D1, and the total thickness D2 of the first substrate, the liquid crystal layer, and the second substrate have a total thickness of D2, wherein $|D1-D2| \leq 0.3$ mm.

In a specific embodiment of the above proposed method, the glass light guide plate has a thickness of D1, and the first substrate, the liquid crystal layer, and the second substrate have a total thickness of D2, wherein $D1=D2$.

In a specific embodiment of the above proposed method, the glass light guide plate is completely adhered on the first surface of the second substrate by an OCA.

In a specific embodiment of the above proposed method, the OCA, the first substrate, the second substrate and the glass light guide plate all have a proximately (such as, completely) same refractive index.

In a specific embodiment of the above proposed method, the first substrate has a thickness of 0.1-0.7 mm, and the second substrate has a thickness of 0.1-0.7 mm.

In other embodiments, the above proposed method further comprises forming a print dot layer on the second surface of the glass light guide plate after adhering the glass light guide plate completely on the first surface of the second substrate, wherein the second surface of the glass light guide plate faces a first surface thereof. The first surface is a surface, which is completely adhered on the first surface of the second substrate, of the glass light guide plate.

BRIEF DESCRIPTION OF THE DRAWINGS

In order to describe the technical solutions in embodiments of the present disclosure more clearly, drawings that will be used in description of the embodiments of the present disclosure will be introduced briefly below. Obviously, the drawings described below only represent some of the embodiments of the present disclosure. To those ordinarily skilled in the art, other embodiments can be obtained from these drawings without inventive skills.

DETAILED DESCRIPTION OF THE EMBODIMENTS

Technical solutions in embodiments of the present disclosure will be described in a clear and complete manner with reference to drawings of the embodiments. Apparently, the described embodiments are some, instead of all, of the embodiments of the present disclosure. All other embodiments obtained by those ordinarily skilled in the art on the basis of the embodiments in the present disclosure without inventive skills shall fall into the protection scope of the present disclosure.

Figure 1:
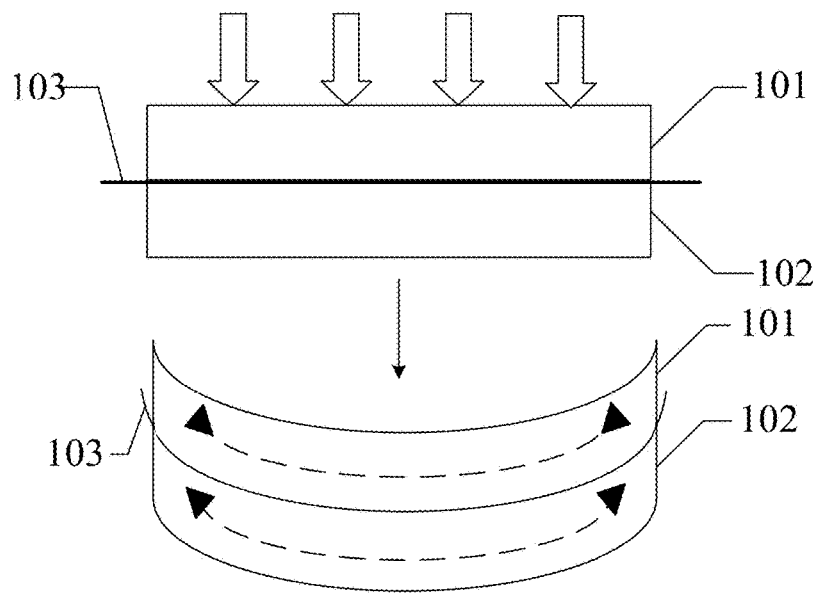
FIG. 1 is a schematic view for states of a first substrate and a second substrate before and after application of a stress according to a conventional curved surface ADS display panel.
Figure 2:
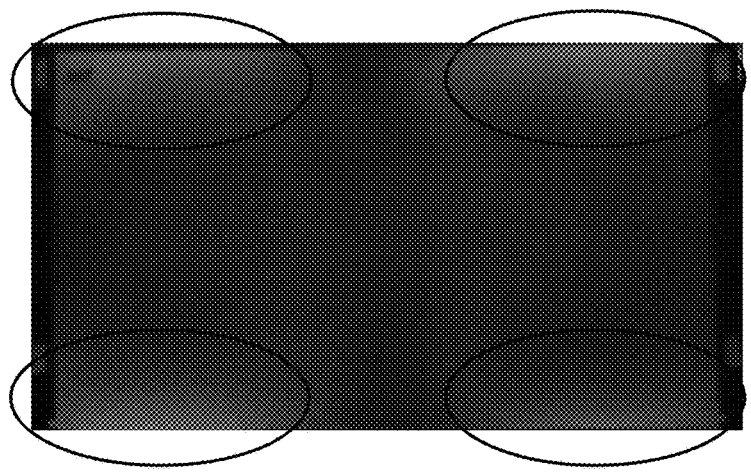
FIG. 2 is a schematic view for dark state light leakage occurred in the curved surface ADS display panel as shown in FIG. 1.
Figure 3:
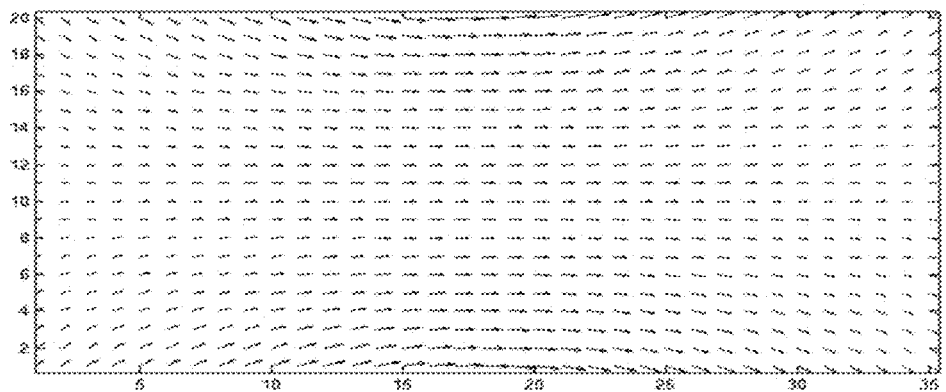
FIG. 3 is a schematic view for light delay occurred in the curved surface ADS display panel as shown in FIG. 1, wherein (a) is a schematic view for light delay in the first substrate, and (b) is a schematic view for light delay in the second substrate.
Figure 3:
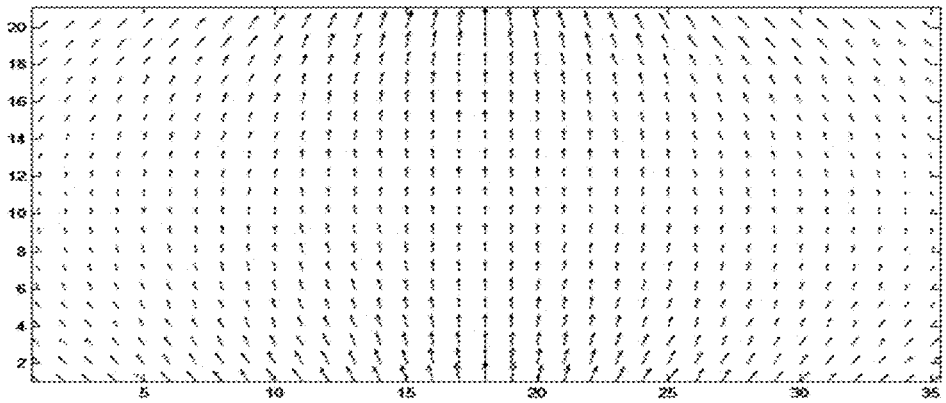
Figure 4:
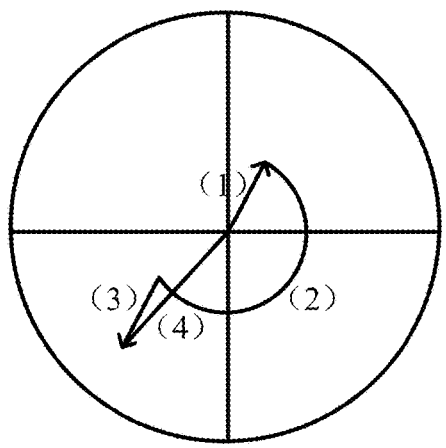
FIG. 4 is a schematic view of a Poincare-sphere for the curved surface ADS display panel as shown in FIG. 1.

FIG. 1 is a schematic view for states of a first substrate and a second substrate before and after application of a stress according to a conventional curved surface ADS display panel. Specifically, as shown in FIG. 1, a stress is applied to the curved surface ADS display panel, so that an upper surface of a first substrate 101 substantially bends to a position at a half of an original entire thickness of the display panel. This position can be considered as a position for a neutral layer 103, wherein the neutral layer 103 refers to a virtual plane layer at a position of ½ thickness of the entire display panel. When a stress is applied, the panel bends. At this time, with the neutral layer 103 being as a dividing line, the first substrate 101 is in a compressed state and is squeezed in a compression direction thus changing the lattice thereof; while a second substrate 102 is in a stretched state and is stretched in a stretching direction thus changing the lattice thereof. In this way, lattice changes in the first substrate 101 and in the second substrate 101 are exactly opposite, so that optical axes of the first substrate 101 and the second substrate 102 are perpendicular to each other. In this case, when light passes through the first substrate 101 and the second substrate 102, different light delays will occur. This will result in a large amount of dark state light leakage in the curved surface ADS display panel, as shown in FIG. 2. Specifically, referring to FIG. 3, (a) represents light delay in the first substrate, and (b) represents light delay in the second substrate. Further, referring to the schematic view of a Poincare-sphere shown in FIG. 4, the center of a circle represents an initial polarization state of light; (1) represents a process of light passing through the second substrate, where the arrow therein represents an angle of the optical axis of the second substrate; (2) represents a process of light passing through the liquid crystal layer, where a delay amount in the liquid crystal layer is 310-350 nm; and (3) represents a process of light passing through the first substrate, where the arrow therein represents an angle of the optical axis of the first substrate. It can be seen that the arrow at (3) and the arrow at (1) have opposite directions, which means that the optical axis of the second substrate is perpendicular to the optical axis of the first substrate. In addition, since the end of the arrow at (3) is deviated from the center of the circle, dark state light leakage occurs after light passing through the second substrate, the liquid crystal layer and the first substrate sequentially, as shown in (4), where a distance of (4), i.e. a distance from the center of the circle to the end of the arrow at (3), represents an amount of dark state light leakage.

Figure 5:
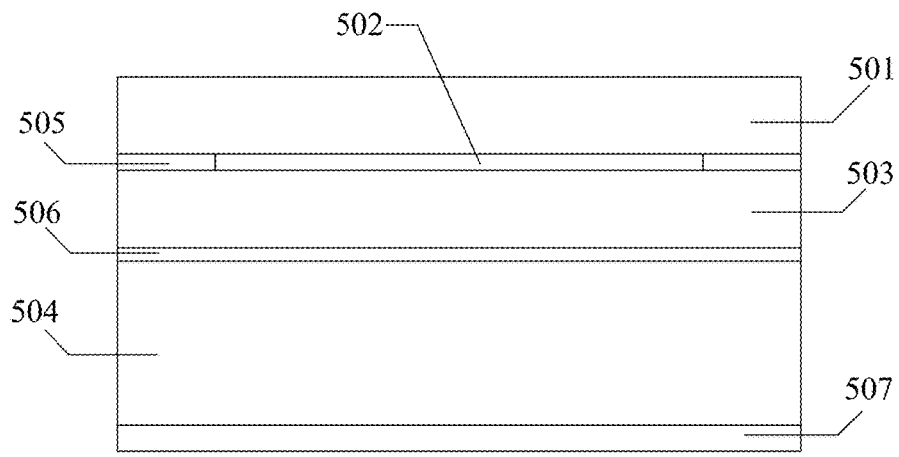
FIG. 5 is a structural view for a curved surface ADS display panel according to an embodiment of the present disclosure.

According to an embodiment of the present disclosure, a curved surface ADS display panel is provided. As shown in FIG. 5, the curved surface ADS display panel comprises: a first substrate 501, a liquid crystal layer 502, a second substrate 503 and a glass light guide plate 504 laminated sequentially.

Specifically, the first substrate 501 and the second substrate 503 are arranged facing each other, with the liquid crystal layer 502 sandwiched therebetween. For example, the first substrate 501 can be a color film substrate, and the second substrate 503 can be an array substrate. In addition, edges of the first substrate 501 and the second substrate 503 are adhered together by a sealant 505 (e.g. a double-sided adhesive). As an example, an upper surface of a glass light guide plate 504 is completely adhered to a lower surface of the second substrate 503. The expression "completely adhered" herein means that all areas of the upper surface of a glass light guide plate 504 are adhered to all areas of the lower surface of the second substrate 503. In this case, the first substrate 501 and the second substrate 503 are adhered together through the sealant 505 and the liquid crystal layer 502. In the meanwhile, the upper surface of the glass light guide plate 504 is completely adhered to the lower surface of the second substrate 503. Thus, as far as the effect of the stress on shapes of the first substrate 501, the second substrate 503 and the glass light guide plate 504 is concerned, the first substrate 501, the second substrate 503 and the glass light guide plate 504 can be considered as a whole.

Figure 6:
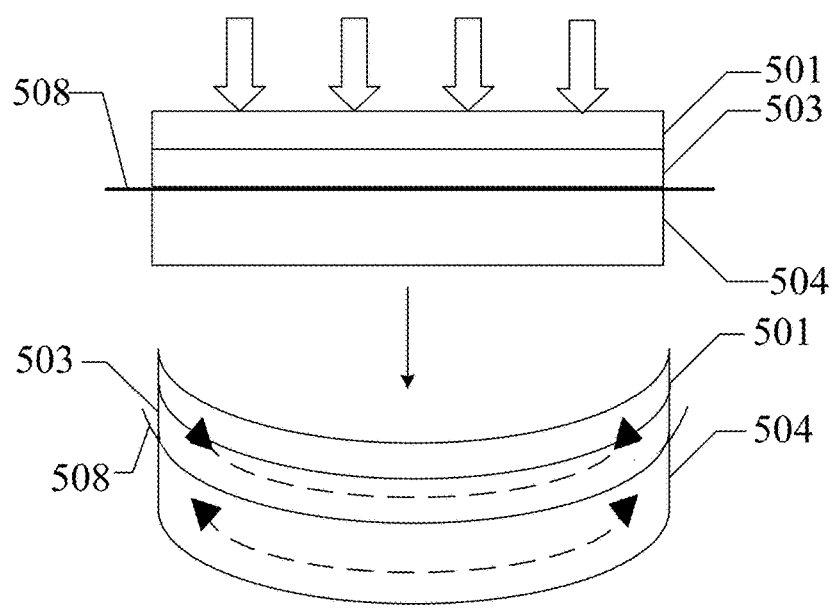
FIG. 6 is a schematic view for states of a first substrate, a second substrate and a glass light guide plate before and after application of a stress in a curved surface ADS display panel according to an embodiment of the present disclosure.
Figure 7:
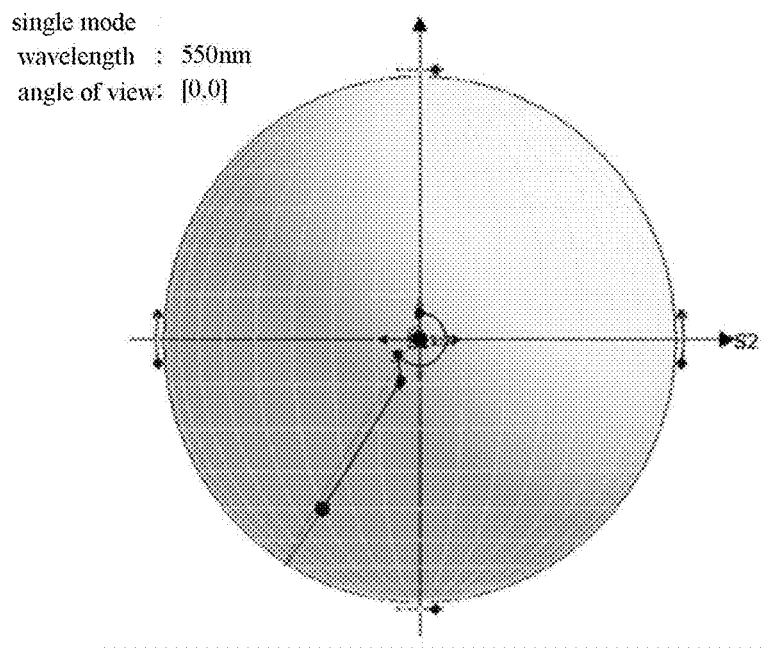
FIG. 7 is a schematic view of Poincare-spheres for different curved surface ADS display panels, wherein (a) is a conventional curved surface ADS display panel, and (b) is a curved surface ADS display panel according to an embodiment of the present disclosure.
Figure 7:
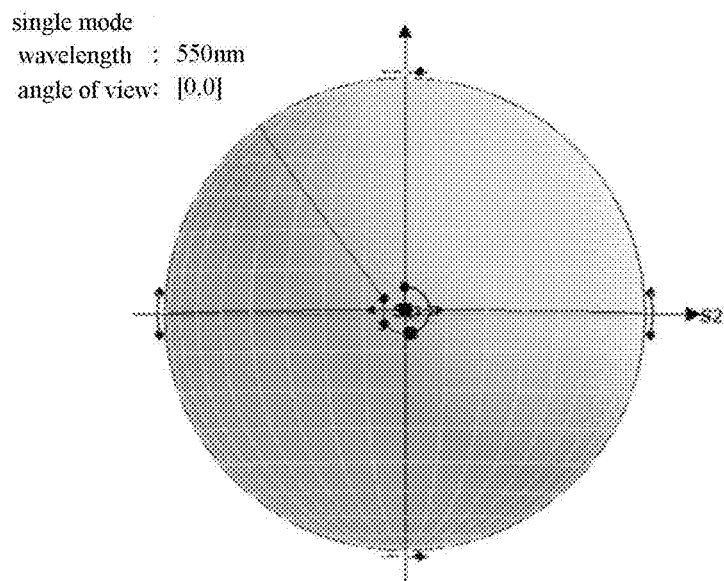

Suppose that the glass light guide plate 504 has a thickness of D1, and a total thickness of the first substrate 501, the liquid crystal layer 502 and the second substrate 503 is D2. In this case, the thickness D1 of the glass light guide plate 504 and the total thickness D2 of the first substrate 501, the liquid crystal layer 502 and the second substrate 503 have a relationship of $|D1-D2|/D1 \leq 30\%$. Thus, the thickness D1 of the glass light guide plate 504 is close to the total thickness D2 of the first substrate 501, the liquid crystal layer 502 and the second substrate 503. As shown in FIG. 6, in this embodiment, a neutral layer 508 for the curved surface ADS display panel is substantially located between the glass light guide plate 504 and the second substrate 503. Therefore, when a stress is applied, both the first substrate 501 and the second substrate 503 that are at one side of the neutral layer 508 are in a compressed state, while the glass light guide plate 504 at the other side of the neutral layer 508 is in a stretched state. Since the first substrate 501 and the second substrate 503 are both in the compressed state, lattice changes thereof are the same, and the first substrate 501 and the second substrate 503 have parallel optical axes. In this way, when light emitted from the glass light guide plate 504 passes through the first substrate 501 and the second substrate 503, light delay can be reduced, thereby reducing the amount of dark state light leakage for the curved surface ADS display panel. As shown in FIG. 7, (a) is a schematic view of a Poincare-sphere for a conventional curved surface ADS display panel, and (b) is a schematic view of a Poincare-sphere for a curved surface ADS display panel according to an embodiment of the present disclosure. As can be seen from the figure, when compared with conventional solutions, in the curved surface ADS display panel according to the embodiment of the present disclosure, the end point position on the Poincare-sphere is closer to the start point position, thus reducing dark state light leakage. Generally speaking, the amount of light leakage in the curved surface ADS display panel according to the embodiment of the present disclosure is 1/10 of the amount of light leakage in the conventional curved surface ADS display panel.

Alternatively, a difference between the thickness D1 of the glass light guide plate 504 and the total thickness D2 of the first substrate 501, the liquid crystal layer 502 and the second substrate 503 has an absolute value not more than 0.3 mm. In this way, it is further ensured that the neutral layer 508 is sandwiched between the glass light guide plate 504 and the second substrate 503, so as to further reduce the amount of dark state light leakage.

Alternatively, the thickness D1 of the glass light guide plate 504 equals to the total thickness D2 of the first substrate 501, the liquid crystal layer 502 and the second substrate 503. Thus, it is further ensured that the neutral layer 508 can be sandwiched between the glass light guide plate 504 and the second substrate 503, and the amount of dark state light leakage can be further reduced. For example, when the total thickness D2 of the first substrate 501, the liquid crystal layer 502 and the second substrate 503 is 1 mm, the thickness D1 of the glass light guide plate 504 is also chosen to be 1 mm.

Alternatively, the thickness of the first substrate 501 is 0.1-0.7 mm, and the thickness of the second substrate 503 is 0.1-0.7 mm. Typically, the greater the total thickness of the first substrate 501 and the second substrate 503 is, the larger the amount of dark state light leakage will be. Therefore, in this embodiment, the first substrate 501 and the second substrate 503 are relatively thin, so as to reduce the amount of dark state light leakage.

Alternatively, the upper surface of the glass light guide plate 504 and the lower surface of the second substrate 503 are adhered completely to each other by an OCA 506. The OCA 506 has a light transmissivity of over 90%, and is extremely thin as compared to the second substrate 503 and the light guide plate 504. Thus, it will not have any impact on the entire thickness, and will not influence the position of the neutral layer 508.

Alternatively, the OCA 506, the first substrate 501, the second substrate 503 and the glass light guide plate 504 have a proximately same refractive index, so that there is few light scattering, and a good bright state display effect is guaranteed.

According to an embodiment of the present disclosure, the glass light guide plate 504 and the second substrate 503 are completely adhered to each other. Therefore, in order to guarantee the effect of complete adhering, in specific embodiments, such structures as the prismatic lens, the diffuser, etc. are no longer provided for the curved surface ADS display panel. In view of this, as an example, the curved surface ADS display panel further comprises a print dot layer 507. Since the glass light guide plate 504 is made of glass, the print dot layer 507 can be used to replace structures like the prismatic lens, the diffuser, etc. for refracting, scattering, and so on. The print dot layer 507 is provided on the upper surface of the glass light guide plate 504, i.e. the surface facing the lower surface of the glass light guide plate 504.

In summary, in the curved surface ADS display panel provided by the embodiment of the present disclosure, by adhering the glass light guide plate 504 completely to the second substrate 503, the first substrate 501, the second substrate 503 and the glass light guide plate 504 can be considered as a whole. In addition, the thickness D1 of the glass light guide plate 504 and the total thickness D2 of the first substrate 501, the liquid crystal layer 502 and the second substrate 503 have a relationship of $|D1-D2|/D1 \leq 30\%$. In this way, the thickness D1 of the glass light guide plate 504 is close to the total thickness D2 of the first substrate 501, the liquid crystal layer 502 and the second substrate 503. In this case, the neutral layer 508 is substantially located between the glass light guide plate 504 and the second substrate 503. Therefore, when a stress is applied, both the first substrate 501 and the second substrate 503 that are at one side of the neutral layer 506 are in a compressed state, while the glass light guide plate 504 at the other side of the neutral layer 506 is in a stretched state. Since the first substrate 501 and the second substrate 503 are both in the compressed state, lattice changes thereof are the same, and the first substrate 501 and the second substrate 503 have parallel optical axes. In this way, when light emitted from the glass light guide plate 504 passes through the first substrate 501 and the second substrate 503, light delay can be reduced, thereby reducing the amount of dark state light leakage for the curved surface ADS display panel. In addition, by making the OCA 506, the first substrate 501, the second substrate 503 and the glass light guide plate 504 have a proximately same refractive index, light scattering can be further reduced, and a good bright state display effect is guaranteed.

Figure 8:
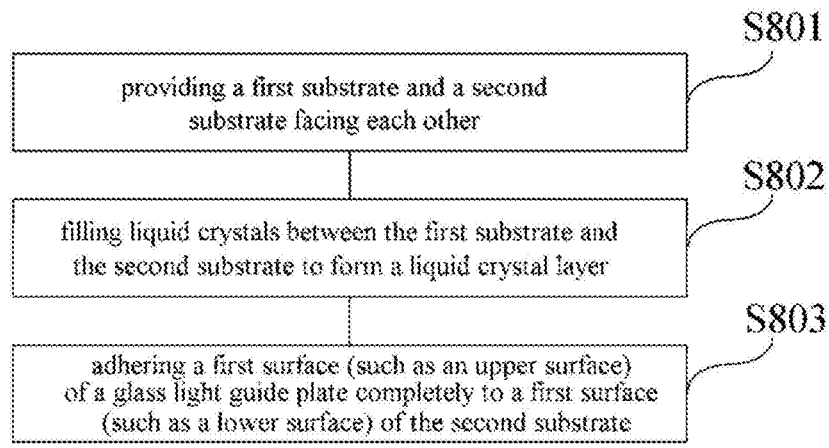
FIG. 8 is a flow chart of a method for manufacturing a curved surface ADS display panel according to an embodiment of the present disclosure.

According to an embodiment of the present disclosure, a method for manufacturing a curved surface ADS display panel is provided. As shown in FIG. 8, the method comprises the following steps.

In Step S801, a first substrate and a second substrate facing each other are provided. Alternatively, the first substrate has a thickness of 0.1-0.7 mm, and the second substrate has a thickness of 0.1-0.7 mm. The first substrate and the second substrate are relatively thin, so as to reduce the amount of dark state light leakage.

In Step S802, liquid crystals are filed between the first substrate and the second substrate to form a liquid crystal layer.

In Step S803, a first surface (specifically, an upper surface) of a glass light guide plate is adhered completely to a first surface (specifically, a lower surface) of the second substrate.

In an embodiment, a thickness D1 of the glass light guide plate and a total thickness D2 of the first substrate, the liquid crystal layer, and the second substrate have a relationship of |D1−D2|/D1≤30%. Alternatively, the thickness D1 of the glass light guide plate and the total thickness D2 of the first substrate, the liquid crystal layer, and the second substrate have a relationship of |D1−D2|≤0.3 mm. Alternatively, the thickness D1 of the glass light guide plate equals to the total thickness D2 of the first substrate, the liquid crystal layer, and the second substrate, i.e. D1=D2.

Alternatively, in step S803, the glass light guide plate is completely adhered to the first surface of the second substrate by an OCA. As an example, the OCA, the first substrate, the second substrate and the glass light guide plate have a proximately same refractive index, so that less light is scattered and a good bright state display effect is guaranteed.

By means of the operation of adhering completely in step S803, the first substrate, the second substrate and the glass light guide plate can be considered as a whole. In addition, since the thickness of the glass light guide plate and the total thickness of the first substrate, the liquid crystal layer, and the second substrate have the above-mentioned relationships, the neutral layer is located between the glass light guide plate and the second substrate. Therefore, when a stress is applied, both the first substrate and the second substrate that are at one side of the neutral layer are in a compressed state, while the glass light guide plate at the other side of the neutral layer is in a stretched state. Since the first substrate and the second substrate are both in the compressed state, lattice changes thereof are the same, and the first substrate and the second substrate have parallel optical axes. Therefore, when light emitted from the glass light guide plate passes through the first substrate and the second substrate, light delay can be reduced, thereby reducing the amount of dark state light leakage for the curved surface ADS display panel.

Figure 9:
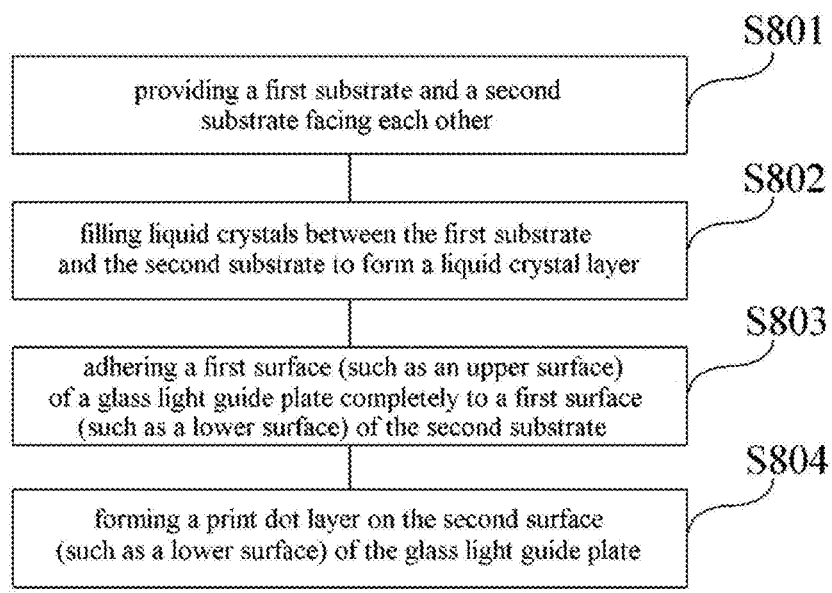
FIG. 9 is a flow chart of a method for manufacturing a curved surface ADS display panel according to another embodiment of the present disclosure.

In another embodiment of the present disclosure, the manufacturing method further comprises a step S804 following step S803, i.e. forming a print dot layer on the second surface (specifically, a lower surface) of the glass light guide plate, as shown in FIG. 9.

By means of step S804, the print dot layer is formed to replace such structures as the prismatic lens, the diffuser, etc. for refracting, scattering, and so on.

In summary, according to an embodiment of the present disclosure, by means of the method for manufacturing a curved surface ADS display panel, a curved surface ADS display panel with a smaller amount of dark state light leakage can be manufactured.

In this description, embodiments are described in a progressive manner and only the differences between each embodiment and the rest ones are emphasized, such that same or similar features among these embodiments are omitted.

Although certain embodiments of the present disclosure have been described, once the basic inventive concept are learned by those skilled in the art, they can further change and modify these embodiments. Thus, the appended claims intend to include the preferred embodiments as well as all those changes and modifications that fall into the scope of the present disclosure.

Finally, it shall be noted that in this text, wordings like first and second are only used for differentiating one entity or operation from another entity or operation, but they do not necessarily require or suggest that these entities or operations actually have such relationship or sequence. Besides, the term "include", "comprise" or any other variant thereof does not mean to be exclusive. That is, a process, a method, an article or a terminal device including a series of elements includes not only these elements, but also other elements that are not explicitly listed, or elements inherent to this process, method, article or terminal device. Unless otherwise defined, an element defined by the wording "comprising a . . . " does not mean to exclude the case where the process, method, article or terminal device including said element also includes other elements.

The above descriptions are merely specific embodiments of the present disclosure, but the protection scope of the present disclosure is not limited to them. Any variation or substitution conceivable by those skilled in the art within the technical scope of the present disclosure shall fall into the protection scope of the present disclosure. Therefore, the protection scope of the present disclosure is defined by the protection scope of claims.

The invention claimed is:

1. A curved surface ADS display panel, comprising:
   a first substrate;
   a second substrate facing the first substrate and having a first surface far away from the first substrate;
   a liquid crystal layer sandwiched between the first substrate and the second substrate; and
   a glass light guide plate completely adhered on the first surface of the second substrate,
      wherein the glass light guide plate has a thickness of D1, and the first substrate, the liquid crystal layer, and the second substrate have a total thickness of D2, wherein |D1−D2|/D1≤30%.

2. The curved surface ADS display panel according to claim 1, wherein |D1−D2|≤0.3 mm.

3. The curved surface ADS display panel according to claim 1, wherein D1=D2.

4. The curved surface ADS display panel according to claim 1, wherein the glass light guide plate is completely adhered on the first surface of the second substrate by an optically clear adhesive (OCA).

5. The curved surface ADS display panel according to claim 4, wherein the optically clear adhesive, the first substrate, the second substrate and the glass light guide plate all have a proximately same refractive index.

6. The curved surface ADS display panel according to claim 1, wherein
   the first substrate has a thickness of 0.1-0.7 mm, and
   the second substrate has a thickness of 0.1-0.7 mm.

7. The curved surface ADS display panel according to claim 1, further comprising:
   a print dot layer disposed on a second surface of the glass light guide plate,
      wherein the second surface of the glass light guide plate is opposite to a first surface, which is completely adhered on the first surface of the second substrate, of the glass light guide plate.

8. A method for manufacturing a curved surface ADS display panel, comprising:

providing a first substrate and a second substrate facing each other, wherein the second substrate has a first surface far away from the first substrate;

filling liquid crystals between the first substrate and the second substrate to form a liquid crystal layer; and adhering a glass light guide plate completely on the first surface of the second substrate, wherein the glass light guide plate has a thickness of D1, and the first substrate, the liquid crystal layer, and the second substrate have a total thickness of D2, wherein $|D1-D2|/D1 \leq 30\%$.

9. The method according to claim 8, wherein $|D1-D2| \leq 0.3$ mm.

10. The method according to claim 8, wherein D1=D2.

11. The method according to claim 8, wherein the glass light guide plate is completely adhered on the first surface of the second substrate by an optically clear adhesive.

12. The method according to claim 11, wherein the optically clear adhesive, the first substrate, the second substrate and the glass light guide plate all have a proximately same refractive index.

13. The method according to claim 8, wherein the first substrate has a thickness of 0.1-0.7 mm, and the second substrate has a thickness of 0.1-0.7 mm.

14. The method according to claim 8, further comprising:
forming a print dot layer on a second surface of the glass light guide plate after adhering the glass light guide plate completely to the first surface of the second substrate, wherein the second surface of the glass light guide plate is opposite to a first surface, which is completely adhered on the first surface of the second substrate, of the glass light guide plate.

* * * * *